United States Patent [19]

Watanabe

[11] Patent Number: 4,580,240
[45] Date of Patent: Apr. 1, 1986

[54] MEMORY ARRANGEMENT OPERABLE AS A CACHE AND A LOCAL MEMORY

[75] Inventor: Tadashi Watanabe, Tokyo, Japan

[73] Assignee: Nippon Electric Co., Ltd., Tokyo, Japan

[21] Appl. No.: 449,814

[22] Filed: Dec. 14, 1982

[30] Foreign Application Priority Data

Dec. 15, 1981 [JP] Japan .................. 56-200895

[51] Int. Cl.⁴ ............. G06F 12/06; G06F 12/00
[52] U.S. Cl. .................. 364/900; 365/49
[58] Field of Search ... 364/200 MS File, 900 MS File; 365/49, 189, 230

[56] References Cited

U.S. PATENT DOCUMENTS

| | | | |
|---|---|---|---|
| 3,518,631 | 6/1970 | Lindquist | 365/230 |
| 4,045,781 | 8/1977 | Levy et al. | 364/200 |
| 4,047,244 | 9/1977 | Finkemeyer et al. | 364/200 |
| 4,115,855 | 9/1978 | Chiba | 364/200 |
| 4,163,288 | 7/1979 | Vinot | 364/900 |
| 4,219,883 | 8/1980 | Kobayashi et al. | 365/189 |
| 4,354,232 | 10/1982 | Ryan | 364/200 |

Primary Examiner—James D. Thomas
Assistant Examiner—Thomas Lee
Attorney, Agent, or Firm—Sughrue, Mion, Zinn, Macpeak, and Seas

[57] ABSTRACT

In a memory arrangement responsive to a first address signal and comprising a buffer memory for storing a plurality of information groups, each comprising a preselected number of information blocks, and an address array for storing a plurality of second address signals each of which specifies each information block to produce the second address signals equal in number to the preselected number, the first address signal comprises a plurality of fields one of which is a specific field representative of either of first and second operation modes in which the arrangement is operable as cache and local memories, respectively. When the specific field indicates the first mode, the preselected number of the second address signals is compared by a set of comparators with the corresponding fields of the first address signal without masking to derive one of the information blocks of the information group specified by one of the fields. When the specific field indicates the second mode, the comparison is carried out with the first and the second address signals partially masked by a masking circuit.

2 Claims, 5 Drawing Figures

MEMORY ARRANGEMENT OPERABLE AS A CACHE AND A LOCAL MEMORY

BACKGROUND OF THE INVENTION

This invention relates to a memory arrangement for use in an information processor.

As is well known in the art, an information processor comprises a main memory for storing a great deal of information indicative of data and instructions, and a processing unit for processing the information in accordance with a program. The main memory has a predetermined access time while the processing unit, a prescribed operation time. The access time is remarkably longer than the operation time because of a huge capacity of the main memory. In other words, a time difference exists between the access time and the operation time. In order to raise throughput of a whole of the information processor, it is necessary to effectively reduce the time difference.

For this purpose, C. J. Conti has proposed an information processor comprising as a memory arrangement a high speed buffer memory between a main memory and a processing unit, in "CONCEPTS FOR BUFFER STORAGE" published March 1969 by International Business Machines Corporation. With the proposed information processor, a reduction of the time difference is possible only when the information to be accessed is stored in the memory arrangement. Otherwise, the reduction can not be expected. It is readily understood from this fact that the reduction of the time difference is accomplished by increasing a hit ratio representative of a probability that the information in question is present in the memory arrangement. In order to raise the hit ratio, the proposed information processor has utilized the fact that information accessed once by a program tends to be repeatedly accessed together with the neighboring information.

It is to be mentioned here that such a memory arrangement is automatically loaded with information by the use of hardware regardless of control by a program. Stated otherwise, the memory arrangement can not be managed by a programmer. In this sense, the memory arrangement is often called a cache memory.

On the other hand, it often happens that a programmer knows specific information temporarily but frequently used in a program. In this case, a memory arrangement is desirable which is operable as a local memory wherein such specific information is located. By the use of the local memory, the specific information might rapidly be derived from the local memory rather than from the main memory. Improvement of throughput of the information processor might therefore be accomplished because the main memory is not accessed.

However, a conventional information processor practically carries out control operation such that a programmer does not need to pay attention to a state of the memory arrangement in order to save labor of the programmer. As a result, the conventional information processor is disadvantageous in that the programmer can not positively and intentionally utilize the buffer memory. Thus, the improvement of the throughput can not be expected with the conventional information processor even when the programmer knows the specific information.

SUMMARY OF THE INVENTION

It is an object of this invention to provide a memory arrangement which is selectively operable as a cache memory and a local memory.

It is another object of this invention to provide a memory arrangement in which a programmer does not need to devote attention to a state or allocation of information even when the memory arrangement is used as the local memory.

According to this invention, a memory arrangement is operatively coupled to a main memory and operable as a cache memory in a first mode of operation and as a local memory in a second mode of operation. The memory arrangement comprises an address register for registering a group address signal at a time, the group address signal comprising a first, a second, a third, and a fourth field. The first field specifies one of the first and the second modes of operation. The second through the fourth fields are for accessing the main memory. The fourth field indicates one of a predetermined number of group addresses. The memory arrangement comprises information storing means comprising a plurality of group areas accessible by the respective group addresses. The group areas are for storing a plurality of information groups, respectively. Each information group comprises at least one information block variable in number from one to a preselected number. Each group area comprises a plurality of block areas for storing the respective information blocks when the information group stored in the each group area comprises the preselected number of information blocks. One of the group areas that is accessed by the one of the group addresses as a particular group area produces one of the information groups as a particular information group that is stored in the particular group area. The memory arrangement further comprises address array means comprising a plurality of array groups in one-to-one correspondence to the group areas to be accessible by the respective group addresses. Each array group comprises a plurality of array blocks in one-to-one correspondence to the block areas of the group area corresponding to each array group. Each array block is for storing a block address signal comprising a first, a second, and a third part adapted to comparison with the first through the third fields, respectively. The third part indicates one of a plurality of block addresses indicative of the respective block areas of the group area accessed by the one of the group addresses. One of the array groups that is accessed by the one of the group addresses as a particular array group produces those of the block address signals as particular address signals which are stored in the respective array blocks of the particular array group. The memory arrangement comprises information block producing means responsive to the particular address signals, at least the first through the third fields, and the particular information group for producing one of the information blocks of the particular information group that is stored in that one of the block areas of the particular group area which is indicated by the block address of the third part of a specific one of the particular address signals. The specific address signal is selected so as to comprise, when the first field specifies the first mode, the first through the third parts identical with the first through the third fields, respectively, and so as to comprise, when the first field specifies the second mode, the first and the third parts identical with the first and the third fields, respectively.

Figure 1:
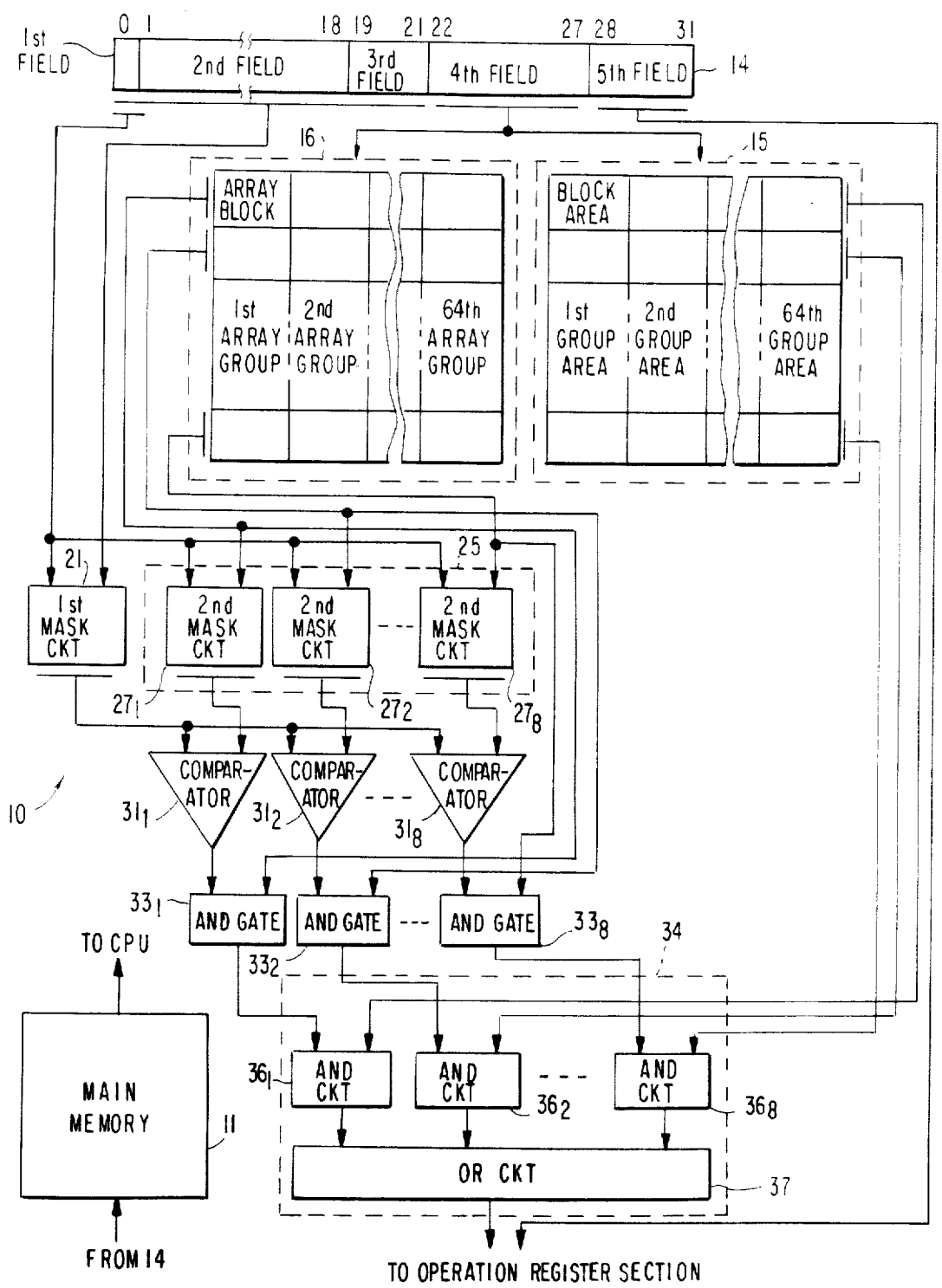
FIG. 1 shows a block diagram of a memory arrangement according to a preferred embodiment of this invention.

DESCRIPTION OF THE PREFERRED EMBODIMENTS:

Referring to FIG. 1, a memory arrangement 10 according to a preferred embodiment of this invention is operatively coupled to a main memory 11 and a control processing unit (not shown) comprising an operation register section (not shown also) comprising, in turn, a plurality of registers. The memory arrangement 10 is operable as a cache memory in a first mode of operation and as a local memory in a second mode of operation in a manner to be described later. Herein, it suffices to say that both of the cache and the local memories can be accessed at a high speed as compared with the main memory 11 and that the local memory can be controllable by software, differing from the cache memory. The memory arrangement 10 comprises an address register 14 for registering an address signal (will be called a group or a first address signal hereinafter) at a time. In the example being illustrated, the address signal has thirtytwo bits arranged from a most significant bit (abbreviated to MSB) represented by a bit number "0" to a least significant bit (LSB) represented by a bit number "31". The address signal comprises a first, a second, a third, a fourth, and a fifth field. The first field positioned at the MSB specifies either one of the first and the second modes of operation, as will be detailed later, and may be called a mode control flag. Let the mode control flag take logic "0" and "1" levels when the first and the second modes of operation are indicated by the central processing unit, respectively. The second through the fifth fields serve to access the main memory 11 and are laid between the bit numbers "1" and "18," between "19" and "21," between "22" and "27," and between "28" and "31," respectively.

The memory arrangement 10 comprises a memory section 15. The memory section 15 is divided into a plurality of block areas equal in number to a product of the number of columns and that of levels, namely, rows. It will be assumed that the memory section 15 comprises sixty-four columns and eight levels and, therefore, has 512 block areas. Under these circumstances, it may be said that the columns form group areas each of which consists of eight block areas. Inasmuch as the memory section 15 includes sixty-four group areas, each group area is specifiable or accessible by the fourth field of six bits. The fourth field, therefore, serves to indicate or specify one of sixty-four group addresses. The first address signal may be called a group address signal because the first address signal has the fourth field for specifying the respective group addresses.

The group areas are for storing a plurality of information groups, respectively. Each information group comprises at least one information block. In each information group, the number of the information block is variable from one to a preselected number, which is equal to eight. If the information group stored in each group area comprises eight information blocks, the information blocks are located in the respective block areas in the group area under consideration. Herein, let one of the group areas be accessed as a particular group area by one of the group addresses indicated by the fourth field. At this time, one of the information group is produced from the particular group area as a particular information group comprising at the maximum eight information blocks. Such information blocks in the particular information group are simultaneously read out of the memory section 15.

Each of the block areas has a word capacity of sixteen words each of which is stored as an information signal consisting of eight bits, namely, one byte. Thus, the illustrated memory section 15 has a total word capacity of eight kilowords on the assumption that the number of 1,024 is nearly equal to one kiloword. The words stored as the information signals may be data or instructions because the data and the instructions are not distinguished from each other in the memory arrangement 10. Each word, namely, each information signal is stored in a word address of each block area of the group areas.

From this fact, it is readily understood that the particular group area concurrently produces the words equal in number to 128 as the particular information group when it is accessed by one of the group addresses.

In FIG. 1, the memory arrangement 10 further comprises an address array 16 comprising, in turn, a plurality of array groups in one-to-one correspondence to the group areas of the memory section 15. The array groups can be accessed by the respective group addresses indicated by the fourth field of the first address signal and are therefore equal in number to sixty-four. Each of the array group comprises a plurality of array blocks, namely, entries in one-to-one correspondence to the block areas of the group area corresponding to each array group.

Figure 2:
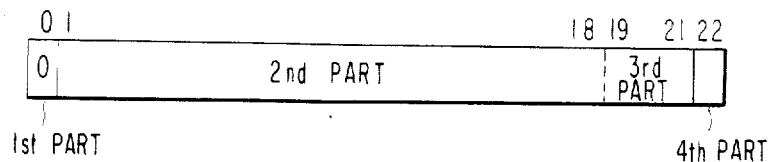
FIG. 2 shows a second address signal which is stored in an address array illustrated in FIG. 1 when the memory arrangement is operable as a cache memory.
Figure 3:
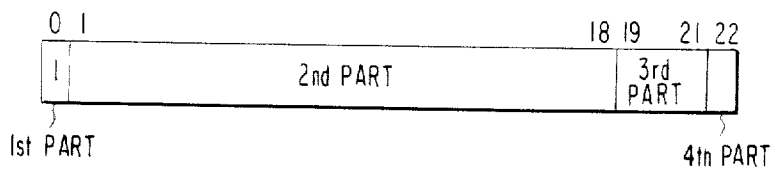
FIG. 3 shows the second address signal which is used when the memory arrangement is operable as a local memory.

Temporarily referring to FIGS. 2 and 3, each of the array blocks is for storing either one of second address signals, namely, block address signals which are exemplified in FIGS. 2 and 3 and each of which is of twenty-three bits numbered from zero to twenty-two. The number zero bit and the number twenty-two bit will be referred to as the leading and the last bits, respectively. Each block address signal comprises a first, a second, a third, and a fourth part, although the second part is not distinguished from the third part in FIG. 2 as will become clear later.

Each first part of the block address signals is located at the leading bit and serves to specify either one of the first and the second modes of operation as is the case with the MSB of the first address signal registered in the address register 14. Let the logic "0" and the logic "1" levels be stored in each first part when the corresponding block area of the memory section 15 is operable in the first and the second modes, respectively. From this fact, it is readily understood that the second address signals illustrated in FIGS. 2 and 3 appear in the first and the second modes, respectively.

As is apparent from FIGS. 2 and 3, the second and the third parts are located between the number one bit and the number eighteen bit and between the number nineteen bit and the number twenty-one bit, respectively. A combination of the second and the third parts illustrated in FIG. 2 serves to access the main memory 11 in the first mode of operation. In other words, the combination of the second and the third parts specifies a part of each address of the main memory 11. On the other hand, the third part illustrated in FIG. 3 specifies a part of each address of the local memory in the second mode of operation, as will later be described in detail. At any rate, the first through the third parts are adapted to comparison with the first through the third fields of the first address signal registered in the address register 14, respectively.

In FIGS. 2 and 3, the third part of three bits indicates one of the block addresses indicative of the respective block areas of each group area as is the case with the third field of the first address signal. As is mentioned above, each group area of the memory section 15 is accessed by one of the group addresses specified by the fourth field of the first address signal. The one group address also accesses one of the array groups as a particular array group. As a result, the one array group, namely, the particular array group produces as particular address signals the second address signals which are stored in the respective array blocks of the particular array group.

In addition, each of the fourth parts indicates validity of the information block stored in one of the block areas that is specified by each fourth part of the second address signal. Let each fourth part be given the logic "1" and the logic "0" levels when the information block in question is valid and invalid, respectively. Thus, the fourth part may be called a validity flag.

Turning back to FIG. 1, it is assumed that the particular information group and the corresponding particular address signals are previously stored in the particular group area and the particular array group by the use of a method known in the art. Such a method may be, for example, a method proposed by Charles P. Ryan in Japanese unexamined patent publication No. Syo 54-109334, namely, No. 109334/1979 corresponding to U.S. Pat. No. 4,156,906. For a better understanding of this invention, description will briefly be made of the method for storing the particular information group and the corresponding particular address signals. Let the particular information group include particular ones of the information signals. In addition, let the mode control flag of the first address signal be given the logic "0" level to indicate the first mode of operation. Under these circumstances, the second through the fifth fields specify a particular one of the main memory addresses. The third through the fifth fields of the first address signal registered in the address register 14 are used to store each of the particular information signals in each word address of one block area of the particular group area. The total number of bits in the third through the fifth fields is equal to thirteen. Therefore, it is possible to access the word addresses equal in number to $2^{13}$ (nearly equal to 8,000) by the use of the third through the fifth fields of the first address signal. At the same time, a specific one of the array blocks in the particular array group is indicated or specified by the third and the fourth fields of nine bits. On this condition, the first through the third fields of the first address signal are stored in the specific array block together with the fourth field which is located at the number twenty-two bit and which serves as the valid flag described in connection with the address array 16.

When the memory arrangement 10 is operated as the local memory in the second mode of operation, the third through the fifth fields are used to store each information signal in each word address of the memory section 15 while the third and the fourth fields specify one of the array blocks in the address array 16, as is the case with the first mode of operation. It should be recalled here that the mode control flag takes the logic "1" level when the memory arrangement 10 is used as the local memory. As a result, the second field is left out of consideration on comparison with the second part of the second address signal, as will later become clear. The second field may therefore have any bit pattern, such as a null bit pattern.

Inasmuch as the memory section 15 is also accessed in the second mode by the third through the fifth fields of thirteen bits, the memory arrangement 10 specifies the word addresses equal in number to $2^{13}$, as described in conjunction with the first mode. More specifically, when the information signals are to be stored in the memory arrangement 10 acting as the local memory and are equal in number to 8 kilowords, all group areas of the memory section 15 are used as the local memory together with all array groups of the address array 16. When the information signals are less in number than 8 kilowords, the remaining group areas or block areas are used as the cache memory together with the corresponding array groups or array blocks. In this event, the local memory equivalently becomes coexistent with the cache memory in the memory arrangement 10.

Figure 4:
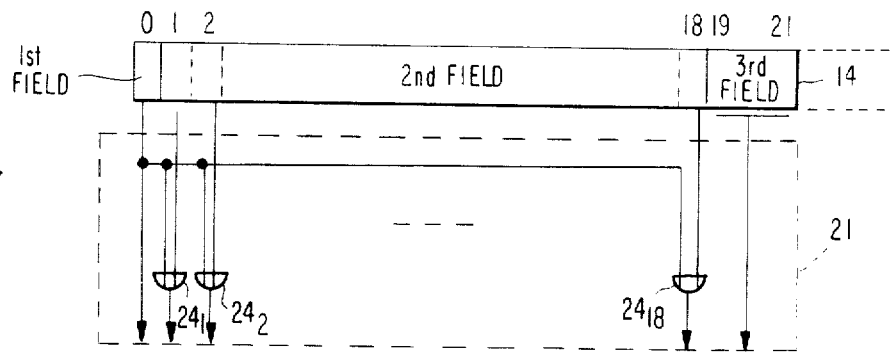
FIG. 4 shows a block diagram of a first mask circuit used in the memory arrangement together with a part of an address register.

Referring to FIG. 1 again and FIG. 4 afresh, the memory arrangement 10 comprises a first mask circuit 21 responsive to the first through the third fields of the first address signal registered in the address register 14. As is shown in FIG. 4, the first mask circuit 21 comprises a plurality of OR gates $24_1, 24_2, \ldots, 24_{18}$ equal in number to eighteen and responsive to the first field, namely, the mode control flag. The OR gates $24_1$ through $24_{18}$ are also supplied with the second field of eighteen bit signals, respectively. As a result, the second field is masked by the first field when the first field specifies the second mode by taking the logic "1" level and, otherwise, the second field is not masked by the first field. The first and the third fields are produced without being masked by the first field even when the first field specifies the second mode.

Thus, the first mask circuit 21 serves to produce the first through the third fields in the first mode and to produce the first and the third fields in the second mode with the second field masked. The second field is regarded as caring nothing (DON'T CARE) in the second mode. Consequently, the first through the third fields specify a part of the main memory address in the first mode so as to put the memory arrangement 10 into operation as the cache memory while the first and the third fields specify a part of the local memory address in the second mode.

Figure 5:
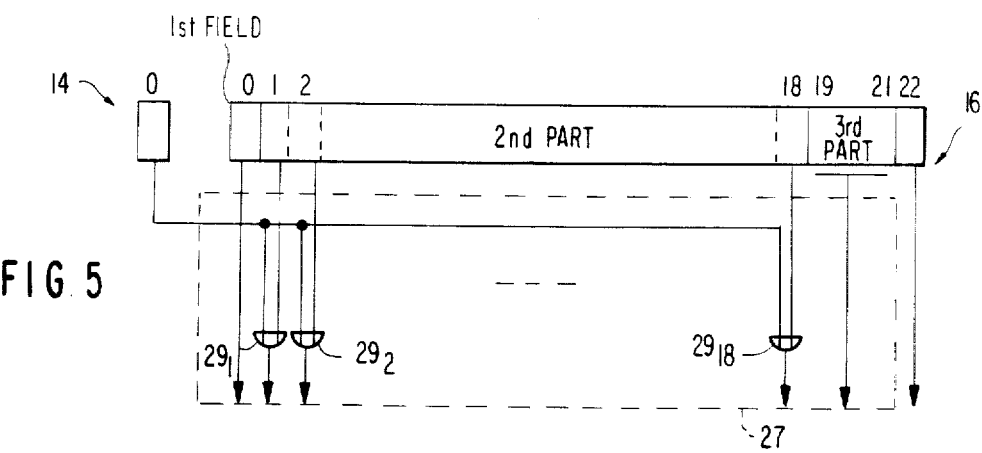
FIG. 5 shows one of second mask circuits illustrated in FIG. 1 together with a part of the address array.

Referring to FIG. 1 again and FIG. 5 afresh, the memory arrangement 10 further comprises a mask section 25 comprising, in turn, a plurality of second mask circuits $27_1, 27_2, \ldots, 27_8$ equal in number to eight, namely, the number of the array blocks included in each array group. In FIG. 5, only one of the second mask circuit 27 is illustrated with suffixes omitted therefrom and is similar in operation to the first mask circuit 21 except that the second mask circuit 27 is responsive to each of the particular address signals stored in the respective array blocks of the particular array group. As is the case with the first mask circuit 21, the second mask circuit 27 also carries out masking operation in response to the first field of the first address signal registered in the address register 14 symbolized in FIG. 5 by a single block. The first and the third parts to which the bit numbers "0" and "19" through "21" are assigned are produced without being masked by the first field of the first address signal.

On the other hand, the second part of each of the second address signal is masked by the first field of the first address signal when the first field specifies the second mode of operation by taking the logic "1" level, like the second field of the first address signal described in conjunction with FIG. 4. For this purpose, the second mask circuit 27 comprises a plurality of OR gates $29_1$, $29_2$, ..., $29_{18}$, equal in number to eighteen.

Thus, each of the second mask circuits 27 produces the first through the third parts of each of the particular address signals in the first mode and produces the first and the third parts in the second mode.

In FIG. 5, the validity flag specified by the fourth part of each second address signal is produced from the number twenty-two bit of each array block.

Further referring to FIG. 1, the first mask circuit 21 and the second mask circuits 27 are coupled to a plurality of comparators $31_1$, $31_2$, ..., $31_8$, equal in number to eight. Each of the comparators 31 (suffixes omitted) compares the first through the third fields with the first through the third parts of each of the particular address signals, respectively, when the first field specifies the first mode. As a result, a first coincidence signal is produced from a specific one of the comparators 31 when the first through the third fields coincide with the first through the third parts of a specific one of the particular address signals, respectively. Thus, the first coincidence signal is representative of selection of the specific address signal and indicates presence of a specific information block stored in that one of the block areas of the particular block area which is specified by the block address of the third part of the specific address signal.

When the first field of the first address signal specifies the second mode, each of the comparators 31 compares the first and the third fields with the first and the third parts of each of the particular address signals to produce a second coincidence signal representative of selection of the specific address signal. The second coincidence signal also indicates presence of the specific information block.

At any rate, the specific address signal is selected by the comparators 31 so as to comprise, when the first field specifies the first mode, the first through the third parts identical with the first through the third fields, respectively, and so as to comprise, when the first field specifies the second mode, the first and the third parts identical with the first and the third fields, respectively.

The comparators $31_1$ through $31_8$ are coupled to a plurality of AND gates $33_1$, $33_2$, ..., $33_8$ which are equal in number to eight and which are supplied with the validity flags of the respective array blocks of each array group, respectively. Each of the validity flags is specified by the fourth part of each second address signal, as is described with reference to FIG. 5. A particular one of the AND gates 33 (suffixes omitted) produces an enable signal on condition that the fourth part of the specific address signal indicates the validity of the specific information block by taking the logic "1" level and that either one of the first and the second coincidence signals is given to the particular AND gate.

Thus, a specific one of the block areas of the memory section 15 is specified by production of the enable signal. In other words, the specific address signal selected from the particular address signals is insured by the enable signal.

From this fact, it is readily understood that the AND gates $33_1$ through $33_8$ are operable to derive the specific address signal from the particular address signals and to produce the enable signal in cooperation with the first and the second mask circuits 21 and 27 and the comparators $31_1$ through $31_8$.

The AND gates 33 are connected to a selecting circuit 34 which is responsive to the particular information group stored in the particular group area specified by the fourth field of the first address signal. The selecting circuit 34 comprises a plurality of AND circuits $36_1$, $36_2$, ..., $36_8$, equal in number to eight and connected to the respective AND gates $33_1$, $33_2$, ..., $33_8$. Supplied with the respective information blocks of the particular information group from the memory section 15, a specific one of the AND circuits 36 produces a specific one of the information blocks only when the specific AND circuit 36 is responsive to the enable signal. It is needless to say that the specific information block is present in the particular information group specified by the fourth field of the first address signal and includes sixteen words.

The specific information block is sent through an OR circuit 37 included in the selecting circuit 34 to the operation register section of the central processing unit.

Thus, the above-mentioned memory arrangement 10 is put into operation by the use of a set associative technique.

If no specific information block is found in the memory arrangement 10 in the first mode of operation, the main memory 11 is accessed by the first address signal of thirty-two bits registered in the address register 14 in the manner known in the art. This is because the memory arrangement 10 is put into operation as the cache memory in the first mode.

On the other hand, let the specific information block be not found out in the memory arrangement 10 in the second mode. This means that something erroneous is present in the program being executed because the memory arrangement 10 is put into operation as the local memory. Presence of an error is therefore indicated or displayed for a programmer.

It is to be mentioned here that the first field of the first address signal and the first parts of the particular address signals are not masked in the first and the second mask circuits 21 and 27, respectively. Therefore, the comparators 31 never produce the coincidence signals if the first field is incoincident with the first part of each of the particular address signals, even when the remaining fields coincides with the remaining parts, respectively. As is readily understood from this fact, addresses for the cache memory are capable of being distinguished from those for the local memory.

Thus, the memory arrangement 10 is operable as the local memory visible or controllable by software and as the cache memory invisible by software, by the use of the mode control flag and the first and the second mask circuits 21 and 27. In addition, two modes for the cache and the local memories may interchangeably be carried out in the memory arrangement 10. For example, when the memory section 15 and the address array 16 are partly put into operation as the local memory, the remaining portions of each of the memory section 15 and the address array 16 may be used as the cache memory. Thus, the memory arrangement 10 can make the cache memory coexist with the local memory.

When the memory arrangement 10 is operated as the cache memory, it is possible to save labor of a programmer for management or control of the memory arrangement because the cache memory is invisible to software. Furthermore, the memory arrangement 10 can be used as the local memory operable at high speed. As a result, information signals are quickly read out of the local memory when the information signals are stored in the local memory. This means that the memory arrangement 10 is very effective when specific information frequently and repeatedly appears in a program and is known by a programmer.

While this invention has thus far been described in conjunction with the preferred embodiment thereof, it is possible for those skilled in the art to put this invention in practice in various manners. For example, use is possible for those various types of the memory section 15 and the address array 16 which are operable in response to a wide variety of the first address signal registered in the address register 14. The memory arrangement 10 may be operated as a sector buffer, a direct mapping buffer, or a fully associative buffer. The first field may be stored in a flip flop separated from the address register 14 of thirty-one bit.

What is claimed is:

1. A memory arrangement coupling to a main memory and operating as a cache memory in a first mode of operation and as a local memory in a second mode of operation, said memory arrangement comprising:
   an address register for registering a group address signal at a time, said group address signal comprising a first, a second, a third, and a fourth field, said first field specifying one of said first and said second modes of operation, said second through said fourth fields for accessing said main memory, said fourth field indicating one of a predetermined number of group addresses;
   information storing means comprising a plurality of group areas accessible by the respective group addresses, said group areas storing a plurality of information groups, respectively, each information group comprising at least one information block variable in number from one to a preselected number, each group area comprising a plurality of block areas for storing the respective information blocks when the information group stored in said each group area comprises said preselected number of information blocks, one of said group areas that is accessed by said one of the group addresses as a particular group area producing one of said information groups as a particular information group that is stored in said particular group area;
   address array means comprising a plurality of array groups in one-to-one correspondence to said group areas to be accessible by the respective group addresses, each array group comprising a plurality of array blocks in one-to-one correspondence to the block areas of the group area corresponding to said each array group, each array block storing a block address signal comprising a first, a second, and a third part for comparison with said first through said third fields, respectively, said third part indicating one of a plurality of block addresses indicative of the respective block areas of the group area accessed by said one of the group addresses, one of said array groups that is accessed by said one of the group aaddresses as a particular array group producing those of the block address signals as particular address signals which are stored in the respective array blocks of said particular array group; and
   information block producing means responsive to said particular address signals, at least said first through said third fields, and said particular information group for producing one of the information blocks of said particular information group that is stored in that one of the block areas of said particular group area which is indicated by the block address of the third part of a specific one of said particular address signals, said specific address signal selected so as to comprise, when the first field specifies said first mode, the first through the third parts identical with said first through said third fields, respectively, and so as to comprise, when the first field specifies said second mode, the first and the third parts identical with said first and said third fields, respectively; wherein said information block producing means comprises:
   signals deriving means responsive to said particular address signals and said first through said third fields for deriving said specific address signal from said particular address signals to produce an enable signal by comparing, when the first field specifies said first mode, the first through the third parts of each of said particular address signals with said first through said third fields, respectively, and by comparing, when the first field specifies said second mode, the first and the third parts of each of said particular address signals with said first and said third fields, respectively; and
   selecting means responsive to said particular information group and said enable signal for selecting said one information block; and wherein said signal deriving means comprises:
   first masking means responsive to said first through said third fields for masking said second field by said first field only when said first field specifies said second mode, said first masking means thereby producing said first through said third fields in said first mode and producing said first and said third fields in said second mode;
   second masking means responsive to said first field and said particular address signals for masking the second parts of the respective particular address signals only when said first field specifies said second mode, said second masking means thereby producing the first through the third parts of the respective particular address signals in said first mode and producing the first and the third parts thereof in said second mode;
   comparing means coupled to said first and said second masking means for comparing, when said first field specifies said first mode, said first through said third fields with the first through the third parts of each of said particular address signals to produce a first coincidence signal representative of selection of said specific address signal and for comparing, when said first field specifies said second mode, said first and said third fields with the first and the third parts of each of said particular address signals, respectively, to produce a second coincidence signal representative of selection of said specific address signal; and signal supplying means for supplying one of said first and said second coincidence signals as said enable signal to said selecting means.

2. A memory arrangement as claimed in claim 1, each of said particular address signals further comprising a fourth part representative of whether the information block specified by the third part of said each particular address signal is valid or not, wherein said signal supplying means comprises:

means responsive to the fourth parts of the respective particular address signals and said one coincidence signal for producing said enable signal when the fourth part of said specific address signal is representative of validity of said one information block.

* * * * *